(12) United States Patent
Tong et al.

(10) Patent No.: US 10,828,133 B2
(45) Date of Patent: Nov. 10, 2020

(54) INDIRECT ORTHODONTIC BONDING SYSTEMS AND METHODS FOR BRACKET PLACEMENT

(71) Applicant: Swift Health Systems Inc., Irvine, CA (US)

(72) Inventors: Hongsheng Tong, Yorba Linda, CA (US); Robert Lee, Torrance, CA (US); Philong John Pham, Huntington Beach, CA (US); Allen Huynh, Irvine, CA (US)

(73) Assignee: Swift Health Systems Inc., Irvine, CA (US)

( * ) Notice: Subject to any disclaimer, the term of this patent is extended or adjusted under 35 U.S.C. 154(b) by 284 days.

(21) Appl. No.: 15/827,723

(22) Filed: Nov. 30, 2017

(65) Prior Publication Data
US 2018/0153651 A1   Jun. 7, 2018

Related U.S. Application Data

(60) Provisional application No. 62/429,664, filed on Dec. 2, 2016.

(51) Int. Cl.
*A61C 7/14* (2006.01)
*B29C 64/386* (2017.01)
(Continued)

(52) U.S. Cl.
CPC .............. *A61C 7/146* (2013.01); *A61C 7/002* (2013.01); *A61C 13/0019* (2013.01);
(Continued)

(58) Field of Classification Search
CPC ... A61C 7/146; A61C 13/0019; B29C 41/025; B29C 41/08; B29C 41/14; B29C 41/20; B29C 41/52; B29C 64/386
See application file for complete search history.

(56) References Cited

U.S. PATENT DOCUMENTS

| | | |
|---|---|---|
| 1,005,131 A | 10/1911 | Angle et al. |
| 1,307,382 A | 6/1919 | Stanton |
| (Continued) | | |

FOREIGN PATENT DOCUMENTS

| | | |
|---|---|---|
| CN | 103505293 | 1/2014 |
| CN | 203506900 | 4/2014 |
| (Continued) | | |

OTHER PUBLICATIONS

EP Search Report dated May 29, 2020 in EP Application No. 17875658.1.
(Continued)

*Primary Examiner* — Atul P. Khare
(74) *Attorney, Agent, or Firm* — Knobbe, Martens, Olson & Bear LLP

(57) ABSTRACT

Systems and methods for fabricating indirect bonding trays are disclosed. Physical models of a patient's teeth can be created with non-functional placeholder brackets, impressions of which can be transferred to indirect bonding trays. This can create wells in which functional brackets can be placed into, reducing errors created from transferring functional brackets from the physical model onto the indirect bonding trays.

16 Claims, 12 Drawing Sheets

(51) Int. Cl.
- *A61C 13/34* (2006.01)
- *A61C 13/00* (2006.01)
- *B29C 41/52* (2006.01)
- *B29C 41/02* (2006.01)
- *B33Y 10/00* (2015.01)
- *B33Y 30/00* (2015.01)
- *B33Y 80/00* (2015.01)
- *A61C 7/00* (2006.01)

(52) U.S. Cl.
CPC ............ *A61C 13/34* (2013.01); *B29C 41/025* (2013.01); *B29C 41/52* (2013.01); *B29C 64/386* (2017.08); *B33Y 10/00* (2014.12); *B33Y 30/00* (2014.12); *B33Y 80/00* (2014.12)

(56) References Cited

U.S. PATENT DOCUMENTS

| | | |
|---|---|---|
| 1,429,749 A | 9/1922 | Maeulen et al. |
| 2,257,069 A | 9/1941 | Peak |
| 2,495,692 A | 1/1950 | Brusse |
| 2,524,763 A | 10/1950 | Brusse |
| 2,582,230 A | 1/1952 | Brusse |
| 3,256,602 A | 6/1966 | Broussard |
| 3,262,207 A | 7/1966 | Kesling |
| 3,374,542 A | 3/1968 | Moylan, Jr. |
| 3,593,421 A | 7/1971 | Brader |
| 3,683,502 A | 8/1972 | Wallshein |
| 3,691,635 A | 9/1972 | Wallshein |
| 3,762,050 A | 10/1973 | Dal Pont |
| 3,765,091 A | 10/1973 | Northcutt |
| 3,878,610 A | 4/1975 | Coscina |
| 3,936,938 A | 2/1976 | Northcutt |
| 3,975,823 A | 8/1976 | Sosnay |
| 4,103,423 A | 8/1978 | Kessel |
| 4,192,070 A | 3/1980 | Lemchen et al. |
| 4,193,195 A | 3/1980 | Merkel et al. |
| 4,197,643 A | 4/1980 | Burstone et al. |
| 4,268,250 A | 5/1981 | Reeve |
| 4,330,273 A | 5/1982 | Kesling |
| 4,354,833 A | 10/1982 | Fujita |
| 4,354,834 A | 10/1982 | Wilson |
| 4,382,781 A | 5/1983 | Grossman |
| 4,385,890 A | 5/1983 | Klein |
| 4,424,033 A | 1/1984 | Wool |
| 4,436,510 A | 3/1984 | Klein |
| 4,479,779 A | 10/1984 | Wool |
| 4,483,674 A | 11/1984 | Schütz |
| 4,501,554 A * | 2/1985 | Hickham ............... A61C 7/146 433/24 |
| 4,561,844 A | 12/1985 | Bates |
| 4,582,487 A | 4/1986 | Creekmore |
| 4,585,414 A | 4/1986 | Kottermann |
| 4,592,725 A | 6/1986 | Goshgarian |
| 4,634,662 A | 1/1987 | Rosenberg |
| 4,659,310 A | 4/1987 | Kottermann |
| 4,664,626 A | 5/1987 | Kesling |
| 4,674,978 A | 6/1987 | Acevedo |
| 4,676,747 A | 6/1987 | Kesling |
| 4,725,229 A | 2/1988 | Miller |
| 4,797,093 A | 1/1989 | Bergersen |
| 4,797,095 A | 1/1989 | Armstrong et al. |
| 4,842,514 A | 6/1989 | Kesling |
| 4,872,449 A | 10/1989 | Beeuwkes |
| 4,881,896 A | 11/1989 | Bergersen |
| 4,892,479 A | 1/1990 | McKenna |
| 4,897,035 A | 1/1990 | Green |
| 4,900,251 A | 2/1990 | Andreasen |
| 4,978,323 A | 12/1990 | Freedman |
| 5,011,405 A | 4/1991 | Lemchen |
| 5,044,947 A | 9/1991 | Sachdeva et al. |
| 5,055,039 A | 10/1991 | Abbatte et al. |
| 5,092,768 A | 3/1992 | Korn |
| 5,114,339 A | 5/1992 | Guis |
| 5,123,838 A | 6/1992 | Cannon |
| 5,127,828 A | 7/1992 | Suyama |
| 5,131,843 A | 7/1992 | Hilgers et al. |
| 5,154,606 A | 10/1992 | Wildman |
| 5,174,754 A | 12/1992 | Meritt |
| 5,176,514 A | 1/1993 | Viazis |
| 5,176,618 A | 1/1993 | Freedman |
| 5,238,404 A | 8/1993 | Andreiko |
| 5,242,304 A | 9/1993 | Truax et al. |
| 5,248,257 A | 9/1993 | Cannon |
| 5,259,760 A | 11/1993 | Orikasa |
| 5,344,315 A | 9/1994 | Hanson |
| 5,368,478 A | 11/1994 | Andreiko |
| 5,380,197 A | 1/1995 | Hanson |
| 5,399,087 A | 3/1995 | Arndt |
| 5,431,562 A | 7/1995 | Andreiko |
| 5,447,432 A | 9/1995 | Andreiko |
| 5,454,717 A | 10/1995 | Andreiko |
| RE35,169 E | 3/1996 | Lemchen et al. |
| 5,516,284 A | 5/1996 | Wildman |
| 5,624,258 A | 4/1997 | Wool |
| 5,630,715 A | 5/1997 | Voudouris |
| 5,683,243 A | 11/1997 | Andreiko |
| 5,683,245 A | 11/1997 | Sachdeva et al. |
| 5,722,827 A | 3/1998 | Allesee |
| 5,816,800 A | 10/1998 | Brehm |
| 5,820,370 A | 10/1998 | Brosius |
| 5,863,198 A | 1/1999 | Doyle |
| 5,890,893 A | 4/1999 | Heiser |
| 5,975,893 A | 11/1999 | Chishti et al. |
| 5,993,208 A | 11/1999 | Jonjic |
| 6,015,289 A | 1/2000 | Andreiko |
| 6,036,489 A | 3/2000 | Brosius |
| 6,042,374 A | 3/2000 | Farzin-Nia et al. |
| 6,086,364 A | 7/2000 | Brunson |
| 6,089,861 A | 7/2000 | Kelly |
| 6,095,809 A | 8/2000 | Kelly et al. |
| 6,099,304 A | 8/2000 | Carter |
| 6,183,250 B1 | 2/2001 | Kanno et al. |
| 6,190,166 B1 | 2/2001 | Sasakura |
| 6,196,839 B1 | 3/2001 | Ross |
| 6,217,325 B1 | 4/2001 | Chishti et al. |
| 6,227,850 B1 | 5/2001 | Chishti et al. |
| 6,244,861 B1 | 6/2001 | Andreiko |
| 6,250,918 B1 | 6/2001 | Sachdeva et al. |
| 6,315,553 B1 | 11/2001 | Sachdeva et al. |
| 6,318,994 B1 | 11/2001 | Chishti et al. |
| 6,318,995 B1 | 11/2001 | Sachdeva et al. |
| 6,334,853 B1 | 1/2002 | Kopelman et al. |
| 6,350,120 B1 | 2/2002 | Sachdeva et al. |
| 6,358,045 B1 | 3/2002 | Farzin-Nia et al. |
| 6,371,761 B1 | 4/2002 | Cheang et al. |
| 6,394,801 B2 | 5/2002 | Chishti et al. |
| 6,398,548 B1 | 6/2002 | Muhammad et al. |
| 6,413,084 B1 | 6/2002 | Rubbert et al. |
| 6,431,870 B1 | 8/2002 | Sachdeva |
| 6,450,807 B1 | 9/2002 | Chishti et al. |
| 6,464,496 B1 | 10/2002 | Sachdeva et al. |
| 6,471,511 B1 | 10/2002 | Chishti et al. |
| 6,471,512 B1 | 10/2002 | Sachdeva et al. |
| 6,512,994 B1 | 1/2003 | Sachdeva |
| 6,514,074 B1 | 2/2003 | Chishti et al. |
| 6,532,299 B1 | 3/2003 | Sachdeva et al. |
| 6,540,512 B1 | 4/2003 | Sachdeva et al. |
| 6,554,613 B1 | 4/2003 | Sachdeva et al. |
| 6,572,693 B1 | 6/2003 | Wu et al. |
| 6,582,226 B2 | 6/2003 | Jordan et al. |
| 6,587,828 B1 | 7/2003 | Sachdeva |
| 6,595,774 B1 | 7/2003 | Risse |
| 6,554,611 B2 | 8/2003 | Chishti et al. |
| 6,602,070 B2 | 8/2003 | Miller et al. |
| 6,612,143 B1 | 9/2003 | Butscher et al. |
| 6,616,444 B2 | 9/2003 | Andreiko |
| 6,626,666 B2 | 9/2003 | Chishti et al. |
| 6,629,840 B2 | 10/2003 | Chishti et al. |
| 6,632,089 B2 | 10/2003 | Rubbert |
| 6,648,640 B2 | 11/2003 | Rubbert |
| 6,663,385 B2 | 12/2003 | Tepper |
| 6,679,700 B2 | 1/2004 | McGann |
| 6,682,344 B1 | 1/2004 | Stockstill |

(56) References Cited

U.S. PATENT DOCUMENTS

| | | |
|---|---|---|
| 6,685,469 B2 | 2/2004 | Chishti et al. |
| 6,685,470 B2 | 2/2004 | Chishti et al. |
| 6,688,885 B1 | 2/2004 | Sachdeva et al. |
| 6,699,037 B2 | 3/2004 | Chishti et al. |
| 6,702,575 B2 | 3/2004 | Hilliard |
| 6,705,863 B2 | 3/2004 | Phan et al. |
| 6,722,880 B2 | 4/2004 | Chishti et al. |
| 6,728,423 B1 | 4/2004 | Rubbert et al. |
| 6,729,876 B2 | 5/2004 | Chishti et al. |
| 6,732,558 B2 | 5/2004 | Butscher et al. |
| 6,733,285 B2 | 5/2004 | Puttler et al. |
| 6,733,287 B2 | 5/2004 | Wilkerson |
| 6,733,288 B2 | 5/2004 | Vallittu et al. |
| 6,736,638 B1 | 5/2004 | Sachdeva et al. |
| 6,738,508 B1 | 5/2004 | Rubbert et al. |
| 6,739,869 B1 | 5/2004 | Taub et al. |
| 6,744,914 B1 | 6/2004 | Rubbert et al. |
| 6,744,932 B1 | 6/2004 | Rubbert et al. |
| 6,746,241 B2 | 6/2004 | Townsend-Hansen |
| 6,755,064 B2 | 6/2004 | Butscher |
| 6,771,809 B1 | 8/2004 | Rubbert et al. |
| 6,776,614 B2 | 8/2004 | Wiechmann |
| 6,830,450 B2 * | 12/2004 | Knopp ............. B29C 43/02 433/6 |
| 6,845,175 B2 | 1/2005 | Kopelman et al. |
| 6,846,179 B2 | 1/2005 | Chapouland |
| 6,851,949 B1 | 2/2005 | Sachdeva et al. |
| 6,860,132 B2 | 3/2005 | Butscher |
| 6,893,257 B2 | 5/2005 | Kelly |
| 6,948,931 B2 | 9/2005 | Chishti et al. |
| 6,971,873 B2 | 12/2005 | Sachdeva |
| 6,988,889 B2 | 1/2006 | Abels |
| 7,008,221 B2 | 3/2006 | McGann |
| 7,013,191 B2 | 3/2006 | Rubbert |
| 7,020,963 B2 | 4/2006 | Cleary et al. |
| 7,029,275 B2 | 4/2006 | Rubbert |
| 7,033,171 B2 | 4/2006 | Wilkerson |
| 7,037,107 B2 | 5/2006 | Yamamoto |
| 7,056,115 B2 | 6/2006 | Phan et al. |
| 7,063,531 B2 | 6/2006 | Maijer et al. |
| 7,068,836 B1 | 6/2006 | Rubbert et al. |
| 7,076,980 B2 | 7/2006 | Butscher |
| 7,077,646 B2 | 7/2006 | Hilliard |
| 7,077,647 B2 | 7/2006 | Choi et al. |
| 7,080,979 B2 | 7/2006 | Rubbert et al. |
| 7,092,107 B2 | 8/2006 | Babayoff et al. |
| 7,112,065 B2 | 9/2006 | Kopelman et al. |
| 7,125,248 B2 | 10/2006 | Phan et al. |
| 7,134,874 B2 | 11/2006 | Chishti et al. |
| 7,156,661 B2 | 1/2007 | Choi et al. |
| 7,160,110 B2 | 1/2007 | Imgrund et al. |
| 7,172,417 B2 | 2/2007 | Sporbert et al. |
| 7,175,428 B2 | 2/2007 | Nicholson |
| 7,186,115 B2 | 3/2007 | Goldberg et al. |
| 7,188,421 B2 * | 3/2007 | Cleary ............. A61C 7/146 29/896.11 |
| 7,214,056 B2 | 5/2007 | Stockstill |
| 7,229,282 B2 | 6/2007 | Andreiko |
| 7,234,936 B2 | 6/2007 | Lai |
| 7,234,937 B2 | 6/2007 | Sachdeva et al. |
| 7,244,121 B2 | 7/2007 | Brosius |
| 7,245,977 B1 | 7/2007 | Simkins |
| 7,252,506 B2 | 8/2007 | Lai |
| 7,267,545 B2 | 9/2007 | Oda |
| 7,283,891 B2 | 10/2007 | Butscher |
| 7,296,996 B2 | 11/2007 | Sachdeva |
| 7,335,021 B2 | 2/2008 | Nikodem |
| 7,347,688 B2 | 3/2008 | Kopelman et al. |
| 7,354,268 B2 | 4/2008 | Raby et al. |
| 7,357,634 B2 | 4/2008 | Knopp |
| 7,361,017 B2 | 4/2008 | Sachdeva |
| 7,404,714 B2 * | 7/2008 | Cleary ............. A61C 7/146 433/24 |
| 7,416,408 B2 | 8/2008 | Farzin-Nia et al. |
| 7,442,041 B2 | 10/2008 | Imgrund et al. |
| 7,458,812 B2 | 12/2008 | Sporbert et al. |
| 7,471,821 B2 | 12/2008 | Rubbert et al. |
| 7,578,674 B2 | 8/2009 | Chishti et al. |
| 7,585,172 B2 | 9/2009 | Rubbert |
| 7,590,462 B2 | 9/2009 | Rubbert |
| 7,621,743 B2 | 11/2009 | Bathen |
| 7,641,473 B2 | 1/2010 | Sporbert |
| 7,677,887 B2 | 3/2010 | Nicholson |
| 7,704,072 B2 | 4/2010 | Damon |
| 7,717,708 B2 | 5/2010 | Sachdeva |
| 7,722,354 B1 | 5/2010 | Dumas |
| 7,726,968 B2 | 6/2010 | Raby et al. |
| 7,751,925 B2 | 7/2010 | Rubbert |
| 7,811,087 B2 | 10/2010 | Wiechmann |
| 7,837,466 B2 | 11/2010 | Griffith et al. |
| 7,837,467 B2 | 11/2010 | Butscher |
| 7,845,938 B2 | 12/2010 | Kim et al. |
| 7,850,451 B2 | 12/2010 | Wiechmann |
| 7,871,267 B2 | 1/2011 | Griffith et al. |
| 7,909,603 B2 | 3/2011 | Oda |
| 8,029,275 B2 | 10/2011 | Kesling |
| 8,033,824 B2 | 10/2011 | Oda et al. |
| 8,038,444 B2 | 10/2011 | Kitching et al. |
| 8,047,034 B2 | 11/2011 | Butscher |
| 8,057,226 B2 | 11/2011 | Wiechmann |
| 8,070,487 B2 | 12/2011 | Chishti et al. |
| 8,082,769 B2 | 12/2011 | Butscher |
| 8,092,215 B2 | 1/2012 | Stone-collonge et al. |
| 8,102,538 B2 | 1/2012 | Babayoff |
| 8,113,828 B1 | 2/2012 | Greenfield |
| 8,113,829 B2 | 2/2012 | Sachdeva |
| 8,121,718 B2 | 2/2012 | Rubbert |
| 8,142,187 B2 | 3/2012 | Sporbert |
| 8,152,519 B1 | 4/2012 | Dumas et al. |
| 8,192,197 B2 | 6/2012 | Sporbert |
| 8,194,067 B2 | 6/2012 | Raby |
| 8,220,195 B2 | 7/2012 | Maijer et al. |
| 8,266,940 B2 | 9/2012 | Riemeir et al. |
| 8,297,970 B2 | 10/2012 | Kanomi |
| 8,308,478 B2 | 11/2012 | Primus et al. |
| 8,313,327 B1 | 11/2012 | Won |
| 8,359,115 B2 | 1/2013 | Kopelman et al. |
| 8,363,228 B2 | 1/2013 | Babayoff |
| 8,366,440 B2 | 2/2013 | Bathen |
| 8,376,739 B2 | 2/2013 | Dupray |
| 8,382,917 B2 | 2/2013 | Johnson |
| 8,393,896 B2 | 3/2013 | Oda |
| 8,417,366 B2 | 4/2013 | Getto |
| 8,451,456 B2 | 5/2013 | Babayoff |
| 8,454,364 B2 | 6/2013 | Taub et al. |
| 8,459,988 B2 | 6/2013 | Dumas |
| 8,465,279 B2 | 6/2013 | Bathen |
| 8,469,704 B2 | 6/2013 | Oda et al. |
| 8,479,393 B2 | 7/2013 | Abels et al. |
| 8,485,816 B2 | 7/2013 | Macchi |
| 8,500,445 B2 | 8/2013 | Borri |
| 8,517,727 B2 | 8/2013 | Raby et al. |
| 8,545,221 B2 | 10/2013 | Sonte-collenge et al. |
| 8,562,337 B2 | 10/2013 | Kuo et al. |
| 8,591,225 B2 | 11/2013 | Wu et al. |
| 8,591,226 B2 | 11/2013 | Griffith et al. |
| 8,636,505 B2 | 1/2014 | Fornoff |
| 8,638,447 B2 | 1/2014 | Babayoff et al. |
| 8,638,448 B2 | 1/2014 | Babayoff et al. |
| 8,675,207 B2 | 3/2014 | Babayoff |
| 8,678,818 B2 | 3/2014 | Dupray |
| 8,690,568 B2 | 4/2014 | Chapouland |
| 8,708,697 B2 | 4/2014 | Li et al. |
| 8,714,972 B2 | 5/2014 | Eichenberg |
| 8,734,149 B2 | 5/2014 | Phan et al. |
| 8,780,106 B2 | 7/2014 | Chishti et al. |
| 8,805,048 B2 | 8/2014 | Batesole |
| 8,805,563 B2 | 8/2014 | Kopelman et al. |
| 8,807,995 B2 | 8/2014 | Kabbani et al. |
| 8,827,697 B2 | 9/2014 | Cinader, Jr. et al. |
| 8,845,330 B2 | 9/2014 | Taub et al. |
| 8,871,132 B2 | 10/2014 | Abels et al. |
| 8,931,171 B2 | 1/2015 | Rosenberg |
| 8,932,054 B1 | 1/2015 | Rosenberg |

(56) References Cited

U.S. PATENT DOCUMENTS

| | | |
|---|---|---|
| 8,936,464 B2 | 1/2015 | Kopelman |
| 8,961,172 B2 | 2/2015 | Dupray |
| 8,979,528 B2 | 3/2015 | Macchi |
| 8,986,004 B2 | 3/2015 | Dumas |
| 8,992,215 B2 | 3/2015 | Chapouland |
| 8,998,608 B2 | 4/2015 | Imgrund et al. |
| 9,022,781 B2 | 5/2015 | Kuo et al. |
| 9,066,775 B2 | 6/2015 | Bukhary |
| 9,089,386 B2 | 7/2015 | Hagelganz |
| 9,101,433 B2 | 8/2015 | Babayoff |
| 9,119,689 B2 | 9/2015 | Kabbani |
| 9,127,338 B2 | 9/2015 | Johnson |
| 9,144,473 B2 | 9/2015 | Aldo |
| 9,204,942 B2 | 12/2015 | Phan et al. |
| 9,299,192 B2 | 3/2016 | Kopelman |
| 9,301,815 B2 | 4/2016 | Dumas |
| 9,329,675 B2 | 5/2016 | Ojelund et al. |
| 9,339,352 B2 * | 5/2016 | Cinader, Jr. ............ A61C 7/16 |
| 9,402,695 B2 | 8/2016 | Curiel et al. |
| 9,427,291 B2 | 8/2016 | Khoshnevis et al. |
| 9,427,916 B2 | 8/2016 | Taub et al. |
| 9,439,737 B2 | 9/2016 | Gonzales et al. |
| 9,451,873 B1 | 9/2016 | Kopelman et al. |
| 9,492,246 B2 | 11/2016 | Lin |
| 9,498,302 B1 | 11/2016 | Patel |
| D774,193 S | 12/2016 | Makmel et al. |
| 9,510,757 B2 | 12/2016 | Kopelman |
| 9,517,112 B2 | 12/2016 | Hagelganz et al. |
| 9,529,970 B2 | 12/2016 | Andreiko |
| 9,539,064 B2 | 1/2017 | Abels et al. |
| 9,554,875 B2 | 1/2017 | Gualano |
| 9,566,132 B2 | 2/2017 | Stone-collonge et al. |
| 9,566,134 B2 | 2/2017 | Hagelganz et al. |
| 9,585,733 B2 | 3/2017 | Voudouris |
| 9,585,734 B2 | 3/2017 | Lai et al. |
| 9,610,628 B2 | 4/2017 | Riemeier |
| 9,615,901 B2 | 4/2017 | Babyoff et al. |
| 9,622,834 B2 | 4/2017 | Chapouland |
| 9,629,551 B2 | 4/2017 | Fisker et al. |
| 9,707,056 B2 | 7/2017 | Machata et al. |
| 9,814,543 B2 | 11/2017 | Huang et al. |
| 9,844,420 B2 | 12/2017 | Cheang |
| 9,848,958 B2 | 12/2017 | Matov et al. |
| 9,867,678 B2 | 1/2018 | Macchi |
| 9,867,680 B2 | 1/2018 | Damon |
| 9,872,741 B2 | 1/2018 | Gualano |
| 9,877,804 B2 | 1/2018 | Chester |
| 9,877,805 B2 | 1/2018 | Abels et al. |
| 9,925,020 B2 * | 3/2018 | Jo ................... A61C 13/34 |
| 9,937,018 B2 | 4/2018 | Martz et al. |
| 9,962,244 B2 | 5/2018 | Esbech et al. |
| 9,975,294 B2 | 5/2018 | Taub et al. |
| 9,987,105 B2 | 6/2018 | Dupray |
| 10,045,834 B2 | 8/2018 | Gualano |
| 10,058,400 B2 | 8/2018 | Abels et al. |
| 10,058,401 B2 | 8/2018 | Tan |
| 10,064,706 B2 | 9/2018 | Dickerson |
| 10,070,943 B2 | 9/2018 | Fornoff |
| 10,076,780 B2 | 9/2018 | Riemeier et al. |
| 10,130,987 B2 | 11/2018 | Riemeier et al. |
| 10,136,966 B2 | 11/2018 | Reybrouck et al. |
| 10,179,036 B2 | 1/2019 | Lee |
| 10,368,961 B2 * | 8/2019 | Paehl ................... B29C 65/70 |
| 10,383,707 B2 | 8/2019 | Roein Peikar et al. |
| D859,663 S | 9/2019 | Cetta et al. |
| 10,636,522 B2 | 4/2020 | Katzman et al. |
| 10,639,130 B2 * | 5/2020 | Blees ................... A61C 7/146 |
| 2002/0098460 A1 | 7/2002 | Farzin-Nia |
| 2002/0192617 A1 | 12/2002 | Phan et al. |
| 2003/0180689 A1 | 9/2003 | Arx et al. |
| 2004/0072120 A1 | 4/2004 | Lauren |
| 2004/0166459 A1 | 8/2004 | Voudouris |
| 2004/0219471 A1 | 11/2004 | Cleary et al. |
| 2005/0043837 A1 | 2/2005 | Rubbert et al. |
| 2005/0106529 A1 | 5/2005 | Abolfathi et al. |
| 2005/0244780 A1 | 11/2005 | Abels et al. |
| 2005/0244781 A1 | 11/2005 | Abels et al. |
| 2006/0068354 A1 | 3/2006 | Jeckel |
| 2006/0257813 A1 | 11/2006 | Highland |
| 2007/0015103 A1 | 1/2007 | Sorel |
| 2007/0031773 A1 | 2/2007 | Scuzzo |
| 2007/0087302 A1 | 4/2007 | Reising et al. |
| 2007/0111154 A1 | 5/2007 | Sampermans |
| 2007/0141525 A1 | 6/2007 | Cinader, Jr. |
| 2007/0154859 A1 | 7/2007 | Hilliard |
| 2007/0190478 A1 | 8/2007 | Goldberg et al. |
| 2007/0231768 A1 | 10/2007 | Hutchinson |
| 2008/0032250 A1 | 2/2008 | Kopelman et al. |
| 2008/0160475 A1 | 7/2008 | Rojas-Pardini |
| 2008/0199825 A1 | 8/2008 | Jahn |
| 2008/0254403 A1 | 10/2008 | Hilliard |
| 2008/0286711 A1 | 11/2008 | Corcoran et al. |
| 2009/0042160 A1 | 2/2009 | Ofir |
| 2009/0191502 A1 | 7/2009 | Cao et al. |
| 2009/0197217 A1 | 8/2009 | Butscher et al. |
| 2009/0220907 A1 | 9/2009 | Suyama |
| 2010/0092903 A1 | 4/2010 | Sabilla |
| 2010/0092905 A1 | 4/2010 | Martin |
| 2010/0105000 A1 | 4/2010 | Scommegna |
| 2010/0129766 A1 | 5/2010 | Hilgers |
| 2010/0178628 A1 | 7/2010 | Kim |
| 2010/0179789 A1 | 7/2010 | Sachdeva et al. |
| 2010/0193979 A1 | 8/2010 | Goldberg et al. |
| 2010/0279243 A1 | 11/2010 | Cinader, Jr. et al. |
| 2010/0304321 A1 | 12/2010 | Patel |
| 2011/0008745 A1 | 1/2011 | McQuillan et al. |
| 2011/0059414 A1 | 3/2011 | Hirsch |
| 2011/0250556 A1 | 10/2011 | Heiser |
| 2011/0287376 A1 | 11/2011 | Walther |
| 2012/0148972 A1 | 6/2012 | Lewis |
| 2012/0208144 A1 | 8/2012 | Chiaramonte |
| 2013/0065193 A1 | 3/2013 | Curiel et al. |
| 2013/0196281 A1 | 8/2013 | Thornton |
| 2013/0196282 A1 | 8/2013 | Eichelberger et al. |
| 2014/0120491 A1 | 5/2014 | Khoshnevis et al. |
| 2014/0154637 A1 * | 6/2014 | Hansen ................... A61C 7/20 433/20 |
| 2014/0170586 A1 | 6/2014 | Cantarella |
| 2014/0287376 A1 | 9/2014 | Hultgren et al. |
| 2015/0010879 A1 | 1/2015 | Kurthy |
| 2015/0064641 A1 | 3/2015 | Gardner |
| 2015/0072299 A1 | 3/2015 | Alauddin et al. |
| 2015/0140501 A1 | 5/2015 | Kim |
| 2015/0351872 A1 | 12/2015 | Jo |
| 2016/0074139 A1 | 3/2016 | Machata et al. |
| 2016/0106522 A1 | 4/2016 | Kim |
| 2016/0166357 A1 | 6/2016 | Portalupi |
| 2016/0206403 A1 | 7/2016 | Ouellette et al. |
| 2016/0242871 A1 | 8/2016 | Morton et al. |
| 2016/0287354 A1 | 10/2016 | Viecilli et al. |
| 2016/0310239 A1 | 10/2016 | Paehl et al. |
| 2016/0361141 A1 | 12/2016 | Tong et al. |
| 2016/0361142 A1 | 12/2016 | Tong et al. |
| 2016/0374780 A1 | 12/2016 | Carrillo Gonzalez et al. |
| 2017/0105817 A1 | 4/2017 | Chun et al. |
| 2017/0128169 A1 | 5/2017 | Lai et al. |
| 2017/0151037 A1 | 6/2017 | Lee |
| 2017/0156823 A1 | 6/2017 | Roein et al. |
| 2017/0165532 A1 | 6/2017 | Khan et al. |
| 2017/0196660 A1 | 7/2017 | Lee |
| 2017/0224444 A1 | 8/2017 | Viecilli et al. |
| 2017/0252140 A1 | 9/2017 | Murphy et al. |
| 2017/0296304 A1 | 10/2017 | Tong et al. |
| 2018/0014916 A1 | 1/2018 | Cinader, Jr. et al. |
| 2018/0021108 A1 | 1/2018 | Cinader, Jr. et al. |
| 2018/0049847 A1 | 2/2018 | Oda et al. |
| 2018/0185120 A1 | 7/2018 | Wool |
| 2018/0214250 A1 | 8/2018 | Martz |
| 2018/0221113 A1 | 8/2018 | Tong et al. |
| 2018/0303583 A1 | 10/2018 | Tong et al. |
| 2018/0338564 A1 | 11/2018 | Oda et al. |
| 2019/0001396 A1 | 1/2019 | Riemeier et al. |
| 2019/0090989 A1 | 3/2019 | Jo |
| 2019/0159871 A1 | 5/2019 | Chan et al. |

(56) References Cited

U.S. PATENT DOCUMENTS

| | | | |
|---|---|---|---|
| 2019/0175304 A1 | 6/2019 | Morton et al. | |
| 2019/0321138 A1 | 10/2019 | Peikar et al. | |
| 2019/0365507 A1 | 12/2019 | Khoshnevis et al. | |

FOREIGN PATENT DOCUMENTS

| | | |
|---|---|---|
| DE | 3915807 | 11/1990 |
| EP | 1276433 | 1/2003 |
| EP | 2076207 | 7/2009 |
| EP | 2522298 | 11/2012 |
| EP | 2617383 | 7/2013 |
| KR | 100549294 | 1/2006 |
| KR | 100737442 | 7/2007 |
| KR | 100925286 | 5/2009 |
| KR | 101723674 | 4/2017 |
| RU | 133408 U1 | 10/2013 |
| WO | WO 01/80761 | 11/2001 |
| WO | WO 01/85047 | 11/2001 |
| WO | WO 2005/008441 | 1/2005 |
| WO | WO 2008/051774 | 5/2008 |
| WO | WO 2011/034522 | 3/2011 |
| WO | WO 2011/090502 | 7/2011 |
| WO | WO 2011/103669 | 9/2011 |
| WO | WO 2012/089735 | 7/2012 |
| WO | WO 2012/140021 | 10/2012 |
| WO | WO 2013/019398 | 2/2013 |
| WO | WO 2016/148961 | 9/2016 |
| WO | WO 2016/199972 | 12/2016 |
| WO | WO 2017/112004 | 6/2017 |
| WO | WO 2017/194478 A1 | 11/2017 |
| WO | WO 2017/198640 A1 | 11/2017 |
| WO | WO 2018122862 A1 | 7/2018 |

OTHER PUBLICATIONS

International Search Report and Written Opinion for International Application No. PCT/US2017/064021 dated Mar. 2, 2018.
U.S. Appl. No. 15/249,262, filed Aug. 26, 2016, Tong et al.
Coro, Jorge C. et al., "MEAW Therapy" MEAW Therapy-Orthodontic Products, accessed via http://www.orthodonticproductsonline.com/2012/11/meaw-therapy/ on Mar. 14, 2016, published Nov. 12, 2012 in 6 pages.
ElSheikh, Moaaz Mohamed, et al. "A Forsus Distalizer: A Pilot Typodont Study". Jul.-Dec. 2004, KDJ, vol. 7, No. 2, pp. 107-115.
EP Search Report dated Jun. 23, 2016 in EP application No. 13850778.5 in 5 pages.
Gilbert, Alfredo. An in-office wire-bending robot for lingual orthodontics. ResearchGate. Article in Journal of clinical orthodontics: JCO, Apr. 2011.
Glauser-Williams Orthodontics: Appliances, http://www.glauserwilliamsorthodontics.com/treatments/orthodontic-appliances.php , accessed Nov. 30, 2015 in 4 pages.
Jiang et al. Bending Process Analysis and Structure Design of Orthodontic Archwire Bending Robot. International Journal of Smart Home. vol. 7, No. 5 (2013), pp. 345-352. http://dx.doi.org/10.14257/ijsh.2013.7.5.33.
Jiang et al. A Review on Robot in Prosthodontics and Orthodontics. Hindawi Publishing Corporation. Advances in Mechanical Engineering. Article ID 198748. 2014. 11 pages.
Korean Intellectual Property Office (ISA/KR), International Search Report and Written Opinion of the International Searching Authority, dated Feb. 14, 2014, for PCT Application No. PCT/US2013/067560, filed Oct. 30, 2013, entitled Orthodontic Appliance with Snap Fitted, Non-Sliding Archwire.
Mahony, Derek, "How We Got From There to Here and Back". Dental Learning Hub (Capture of web page dated Jun. 24, 2013 downloaded from http://web.archive.org/web/20130624145806/http://www.dental-learninghub.com/Clinical/Orthodontics.aspx, downloaded Feb. 7, 2014).
Miller, R.J. et al. "Validation of Align Technology's Treat III™ Digital Model Superimposition Tool and Its Case Application". Orthodontic Craniofacial Res.,2003, vol. 6 (Suppl 1): pp. 143-149.
SureSmile. 2013. About SureSmile. (Capture of web page dated Jun. 21, 2013 downloaded from http://web.archive.org/web/20130621031404/http://suresmile.com/About-SureSmile, downloaded Feb. 7, 2014).
Xia, et al. Development of a Robotic System for Orthodontic Archwire Bending. 2016 IEEE International Conference on Robotics and Automation (ICRA). Stockholm, Sweden, May 16-21, 2016. pp. 730-735.
Yang, Won-Sik, et al. "A Study of the Regional Load Deflection Rate of Multiloop Edgewise Arch Wire." Angle Orthodontist, 2001, vol. 7, No. 2, pp. 103-109.
International Search Report for International Application No. PCT/US2013/067560 dated Feb. 13, 2014.
International Search Report for International Application No. PCT/US2017/028180 dated Aug. 14, 2017.
International Search Report for International Application No. PCT/US2018/016293 dated May 10, 2018.
International Search Report for International Application No. PCT/US2018/028437 dated Aug. 9, 2018.

\* cited by examiner

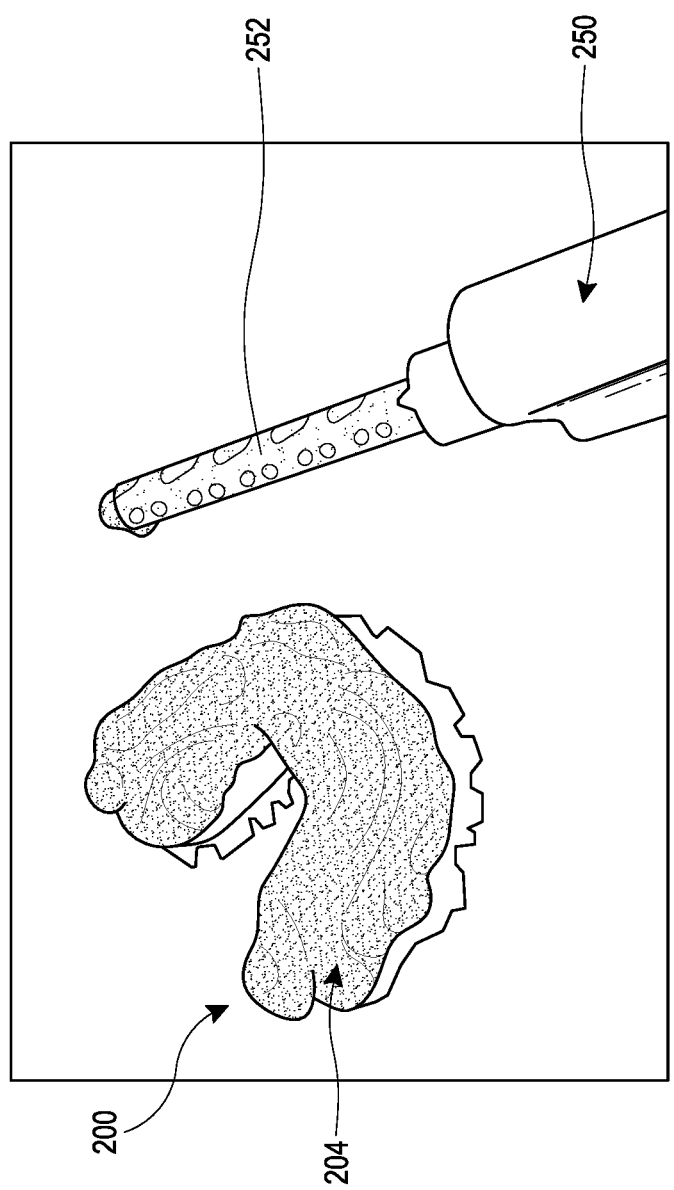

INDIRECT ORTHODONTIC BONDING SYSTEMS AND METHODS FOR BRACKET PLACEMENT

REFERENCE TO RELATED APPLICATIONS

This application claims the benefit under 35 U.S.C. § 119(e) as a non-provisional application of U.S. Prov. App. No. 62/429,664 filed on Dec. 2, 2016, which is hereby incorporated by reference in its entirety. Any and all applications for which a foreign or domestic priority claim is identified in the Application Data Sheet as filed with the present application are hereby incorporated by reference under 37 CFR 1.57.

BACKGROUND

Field of the Invention

This invention relates, in some aspects, to improved indirect bonding systems and methods for orthodontic bracket placement.

SUMMARY

In some embodiments, disclosed herein are methods for fabricating an indirect bonding tray for placement of orthodontic brackets. The methods can involve, for example, providing a physical model of a patient's teeth. The model can include at least one non-functional placeholder orthodontic bracket attached to a tooth of the physical model. A moldable material can be applied over the teeth and at least one placeholder bracket of the physical model, thereby creating an indirect bonding tray. The indirect bonding tray can include at least one well corresponding to the at least one non-functional placeholder bracket. A functional orthodontic bracket can be secured within each well of the indirect bonding tray. The functional orthodontic bracket can include the same external geometry as the non-functional placeholder orthodontic bracket. The moldable material can be cured, and include, for example, polyvinyl siloxane. The model can be a malocclusion model in some cases. The indirect bonding tray can include a plurality of wells corresponding to a plurality of non-functional placeholder brackets. The non-functional placeholder brackets can include the same material as that of the physical model. The non-functional placeholder brackets can be fabricated as integral components of the physical model. The physical model may be rapidly prototyped, such as by three-dimensional (3D) printing in some cases. The physical model may be fabricated according to information from a digital model. The digital modeling and the model fabrication may be performed at remote locations from each other in some instances. The model fabrication and indirect bonding (IDB) tray fabrication may be performed at remote locations from each other in some instances.

Also disclosed herein, in some embodiments, is a method for placing orthodontic brackets onto teeth. The method can include providing an indirect bonding tray comprising wells comprising one or more functional orthodontic brackets. The wells from the functional orthodontic brackets can be created from impressions of non-functional placeholder orthodontic brackets comprising the same external geometry as the functional placeholder orthodontic brackets. The indirect bonding tray can be positioned in contact with a patient's teeth. The functional orthodontic brackets can then be transferred from the indirect bonding tray to the patient's teeth.

Also disclosed herein is a system for use in fabricating an indirect bonding tray for placement of orthodontic brackets. The system can include a physical model of a patient's teeth. The model can include a plurality of non-functional placeholder orthodontic brackets attached to a tooth of the physical model. The non-functional placeholder orthodontic brackets can be permanently attached to respective teeth of the physical model, and as such cannot be transferred for use in the patient's mouth. The non-functional placeholder orthodontic brackets can be specifically configured (e.g., modified from the actual structure of the corresponding functional brackets) to optimize the fabrication (e.g., molding) of an indirect bonding tray to have wells that allow optimal seating or placement of the functional brackets and/or that facilitate transfer of the brackets to a patient's teeth. For example, the placeholder brackets may be optimized by eliminating (e.g., the placeholder brackets may not include) complex internal geometries (e.g., undercuts) that are unnecessary for forming a negative impression that holds and properly positions the functional orthodontic bracket. In other words, the placeholder brackets could include, in some embodiments, only relatively smooth, continuous external surfaces without any undercuts.

In some embodiments, a method for fabricating an indirect bonding tray for placement of orthodontic brackets is disclosed. The method includes providing a physical model of a patient's teeth. The model has at least one, two, or more non-functional placeholder orthodontic brackets attached to a tooth of the physical model. The method further includes applying a moldable material over the teeth and the at least one placeholder bracket of the physical model, thereby creating an indirect bonding tray. The indirect bonding tray has at least one well corresponding to the at least one non-functional placeholder bracket. The method further includes securing a functional orthodontic bracket within each well of the indirect bonding tray. The functional orthodontic bracket has the same external geometry as the non-functional placeholder orthodontic bracket.

The method may include curing the moldable material. The moldable material may be or may include polyvinyl siloxane. The model may be a malocclusion model. The indirect bonding tray may include a plurality of wells corresponding to a plurality of non-functional placeholder brackets. The non-functional placeholder brackets may be the same material as that of the physical model.

The physical model may be fabricated from a digital model of the patient's teeth. The method may include positioning digital brackets on the digital model of the patient's teeth and modifying the geometry of the digital brackets while retaining the overall outline of the external surface of the digital brackets. Modifying the geometry of the digital brackets may include reducing or removing internal undercuts. Modifying the geometry of the digital brackets include removing internal details of the bracket. The method may include digitally moving the teeth from positions of malocclusion to positions of ideal occlusion. The method may further include positioning digital brackets on surfaces of the teeth while in positions of malocclusion and restoring the teeth to positions of malocclusion while maintaining the positioning of the digital brackets on the surfaces of the teeth.

The method may include applying a flexible membrane around the moldable material and shaping the moldable material into the shape of a dental arch. The physical model may include instructive information indicative of proper positioning of the indirect bonding tray on the patient's teeth and/or patient identification and the method may include transferring the instructive information from the physical model to the indirect bonding tray. The method may include transferring instructive information indicative of proper positioning of the indirect bonding tray on the patient's teeth and/or patient identification from an external tray positioned around the moldable material to the indirect bonding tray while the moldable material is moldable. Providing the physical model may include 3D printing the physical model according to a digital model. The physical model may include support structures and the method may include removing the support structures from the physical model prior to applying the moldable material. The physical model can include at least one perforation between two teeth and the method can include sectioning the physical model along the perforation. Providing the physical model may include fabricating the physical model such that only a subset of the patient's teeth corresponding to a segment of the patient's dental arch are fabricated. The indirect bonding tray may correspond in size to the segment of the patient's dental arch.

In some embodiments, a method for placing orthodontic brackets onto teeth is disclosed. The method includes providing an indirect bonding tray having wells. The wells contain a plurality of functional orthodontic brackets. The wells were created from impressions of non-functional placeholder orthodontic brackets comprising the same external geometry as the functional orthodontic brackets. The method further includes positioning the indirect bonding tray in contact with a patient's teeth and transferring the functional orthodontic brackets from the indirect bonding tray to the patient's teeth.

In some embodiments, a system for use in fabricating an indirect bonding tray for placement of orthodontic brackets is disclosed. The system includes a physical model of a patient's teeth. The model includes a plurality of non-functional placeholder orthodontic brackets attached to a plurality of teeth of the physical model. The non-functional placeholder orthodontic brackets are permanently attached to respective teeth of the physical model.

The system may include an indirect bonding tray formed as a negative impression of the physical model. The system may include a plurality of functional orthodontic brackets, each functional orthodontic bracket corresponding in external geometry to one of the plurality of non-functional placeholder orthodontic brackets.

Further features and advantages of various embodiments contemplated by the present disclosure are described in detail below with reference to the accompanying drawings.

BRIEF DESCRIPTION OF THE DRAWINGS

These drawings are illustrative embodiments and do not present all possible embodiments of this invention.

FIGS. 1A and 1B depict side views of an example of a functional orthodontic bracket. FIGS. 1C and 1D illustrate the same views of the bracket as FIGS. 1A and 1B, respectively, including schematic depictions of various possible modifications to the outline of the external surface or geometry of the bracket.

FIGS. 3A-3C illustrate the progressive fabrication of an indirect bonding tray, using polyvinyl siloxane and applying it over the bonding model and ensuring that all placeholder brackets are captured in the impression, according to some embodiments of the invention.

DETAILED DESCRIPTION

Figure 1A:
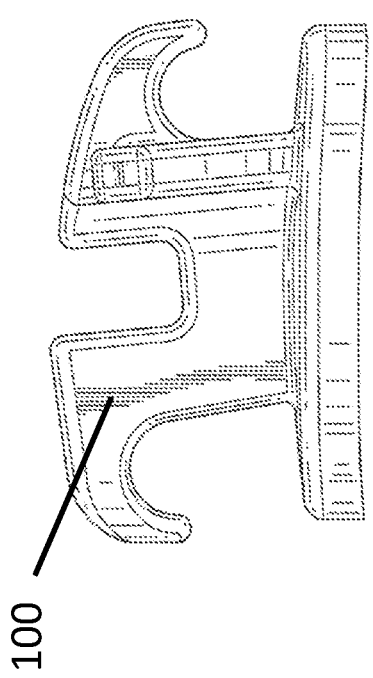
FIGS. 1A-1D schematically illustrate various non-limiting modifications that may be made to the external dimensions or geometry of a digital bracket, according to one embodiment of the invention.

Indirect bonding (IDB) trays have been used in orthodontics to transfer the planned position of brackets from a digital or physical study model to a patient's teeth. In a physical model, this has traditionally been done by placing the functional brackets on a physical model (e.g., outside of the patient) and then transferring the brackets to the patient through an indirect bonding transfer tray technique.

Recently, this process has been improved by digitally planning the position of brackets on a computer. This digital position of the bracket is then transferred to the patient through several methods. One method is to print a jig or indirect bonding tray directly from the digital world which holds the information of the bracket position relative to each tooth. The jig or indirect bonding tray would then be able to deliver a physical bracket to the patient in the digitally planned position. However, the ideal material for forming an indirect bonding tray may not be well-suited for precision fabrication of intricate geometries directly from a digital model. For instance, the ideal indirect bonding tray may have a degree of elasticity, which may be less rigid than ideal for convenient and rapid fabrication, such as by 3D printing. Another method is to print out a physical study model from the digitally planned bracket position. This physical model that is printed from the digitally planned bracket position will usually have "wells" or "indentations" in the surface of the teeth allowing for placement of a physical, functional bracket that is able to be bonded to a tooth and secure an archwire. These physical, functional brackets can then be picked up by an indirect bonding transfer tray and then delivered to the patient through conventional methods. A drawback of this method, in some cases, is that there are often times human error in how the brackets are placed on the physical model, which would propagate onto the indirect bonding tray and then to the patient. For example, the depth of the wells may alter the proper positioning of the functional brackets in the indirect bonding tray and/or if insufficiently deep may allow movement of the indirect bonding tray. Other methods may exist that are slight permutations of the two methods mentioned above. Improved systems and methods are needed.

In some embodiments, disclosed herein are improved systems and methods of creating indirect bonding trays. This method can use in some cases digital planning to place brackets in their correct position. Rather than printing out wells or indentations on a physical model to place the actual brackets, some embodiments create placeholder brackets, which are not the actual physical brackets to be transferred to a patient's teeth, but rather a true outline of the physical brackets or a modified version of the true outline, optimized for indirect transfer methods. The placeholder brackets are non-functional in some embodiments (e.g., cannot secure an archwire), and in some cases can be integrally formed with and not removable with respect to the physical model, such as by using 3D printing or other techniques. In some embodiments, the placeholder brackets lack extra undercut and internal details, but have the same or substantially the same external geometry as their respective functional orthodontic brackets. The placeholder brackets can, in some embodiments, be made of the same material as the physical model, and not be made of any metal in some cases. A tray, such as an indirect bonding tray can then be created from this physical model with placeholder brackets from the true actual outline of the physical brackets. Such methods can be advantageous in some cases in that the brackets can now be seated onto the indirect bonding tray directly, without requiring being picked up by a traditional "pick up method" in which the functional brackets are adhered to the physical model prior to being transferred to the indirect bonding tray. In other words, the functional brackets can be placed directly on the indirect bonding tray without requiring them to be previously transferred from a physical model. One potential benefit is that because the physical brackets are not placed for the first time until the indirect bonding tray is formed, there is potentially less chance of errors, such as inaccurate placement or movement of the brackets during the various steps, such as forming the indirect bonding tray. The brackets in the IDB tray can then be transferred to the teeth using a variety of bonding techniques.

In some embodiments, such methods can allow for easy transport of the model which can now be transmitted digitally to the orthodontist or other health care provider enabling the fabrication of the IDB tray either, for example, in a remote location (such as a manufacturing facility) or at the chairside of a doctor who has a 3D printer in their office. In some embodiments, it is not required that the entire IDB tray be printed for all the teeth. A partial/subset of an IDB tray can be created for targeted placement of a set of brackets or proper replacement of a bracket when required, for example in the case of a bracket that has debonded/come off the tooth, or in the case where there is physical interference of the brackets in the malocclusion state preventing the placement of one or more brackets in secondary step once the initial crowding that caused the interference has been resolved.

Some embodiments of methods for fabricating an in-office IDB tray will now be disclosed. The methods can include, for example, any number of the following elements:

A doctor may take one or more malocclusion digital representations of teeth. The digital representations may be obtained, for example, either from a direct intra-oral 3D digital scan of the teeth, a 3D scan of an impression of the teeth, or qv3D scan of a 3D model of patient's teeth. Any other method for obtaining an accurate 3D representation may be used as well;

The malocclusion digital model may be sent, such as electronically (e.g., via the internet), through the internet to a lab;

The lab may isolate the teeth of the patient's malocclusion digital model into individual teeth or groups of teeth. The lab may digitally move the teeth into ideal occlusion positions;

The lab may position digital representations of orthodontic brackets onto the digital ideal occlusion model;

The digital brackets may be modified representations of functional orthodontic brackets. For instance, the digital brackets may represent an outline of the 3D external geometry of a functional bracket. For example, the digital brackets may be modified to block out excessive undercut and internal details of the functional bracket, leaving 3D structural outlines which will be referred to as placeholder brackets.

Figure 1B:
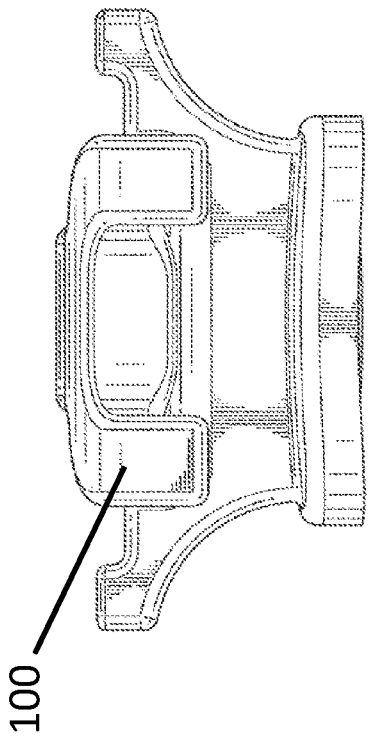
Figure 1C:
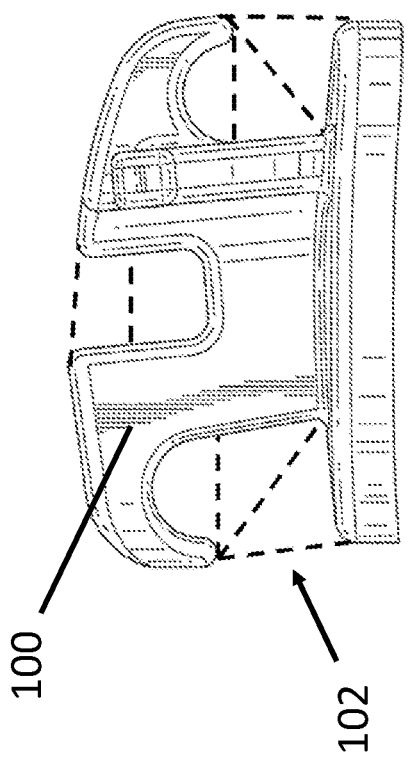
Figure 1D:
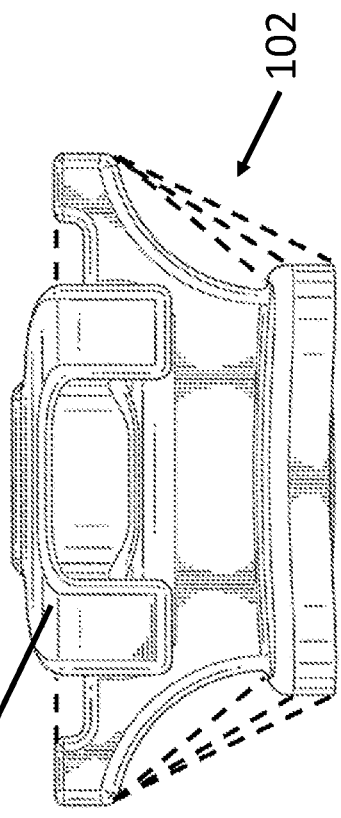
Figure 2:
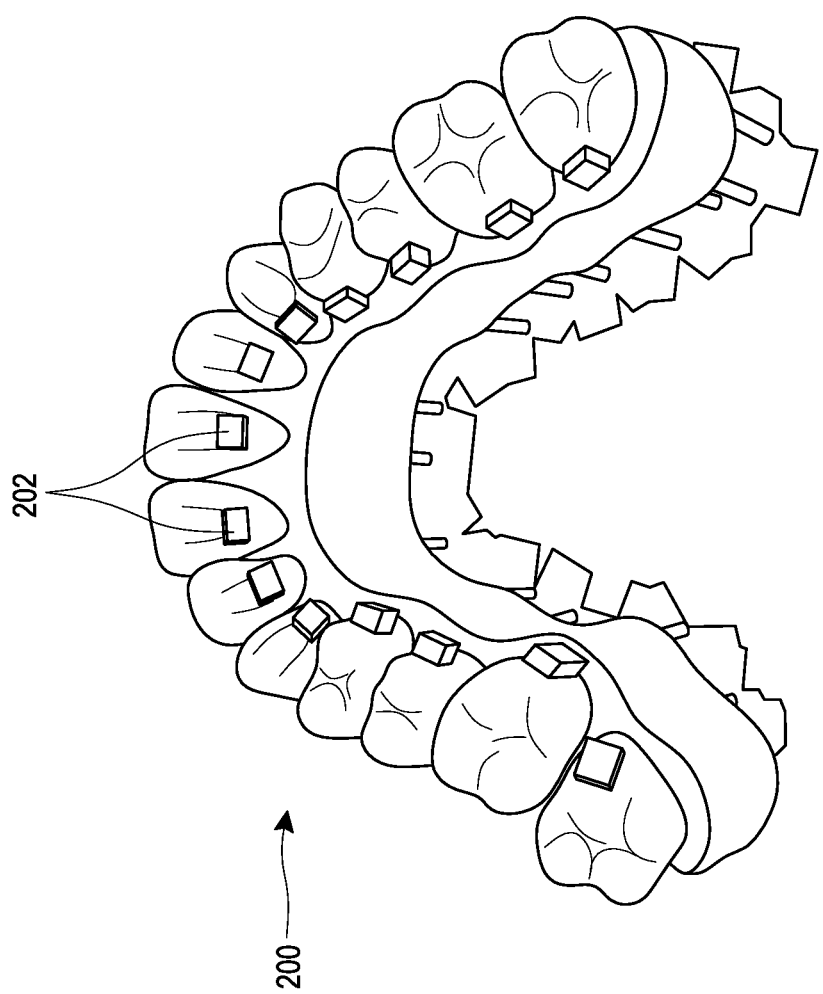
FIG. 2 illustrates a digital 3D print of a fabricated bonding model that includes non-functional placeholder brackets, according to some embodiments of the invention.
Figure 3A:
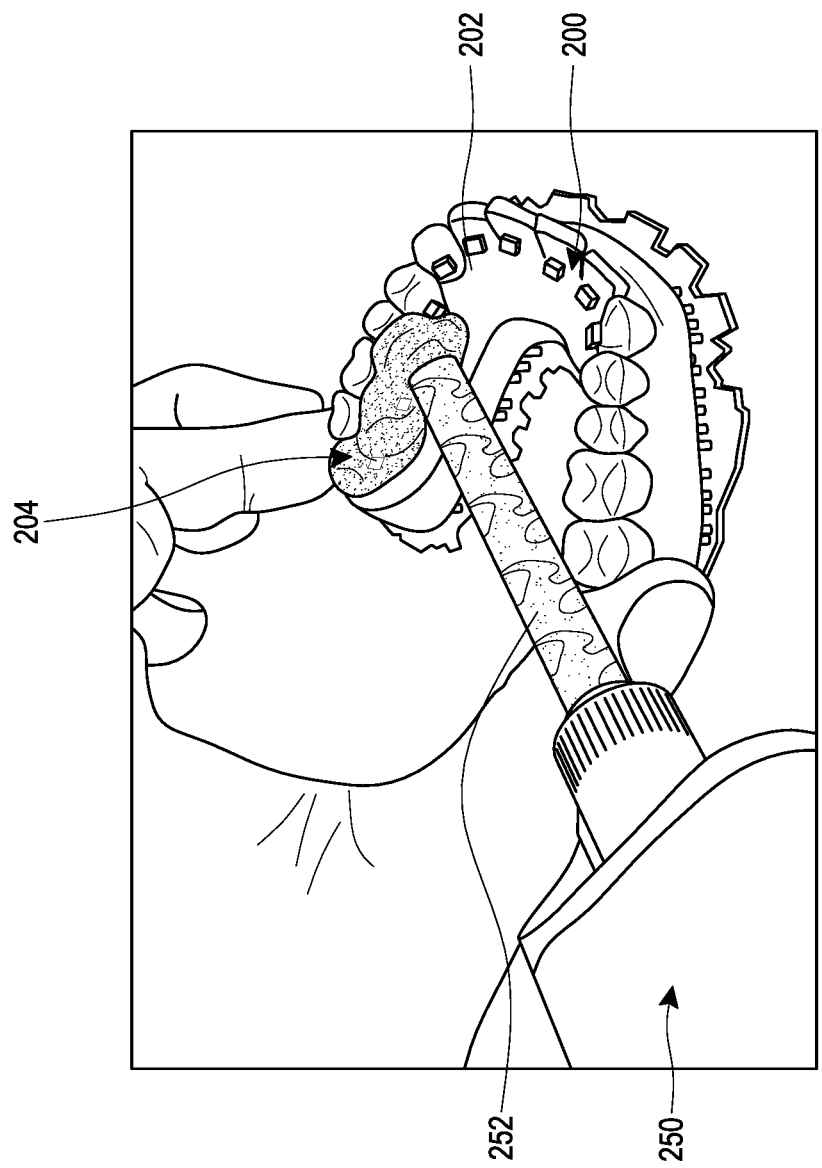
Figure 3B:
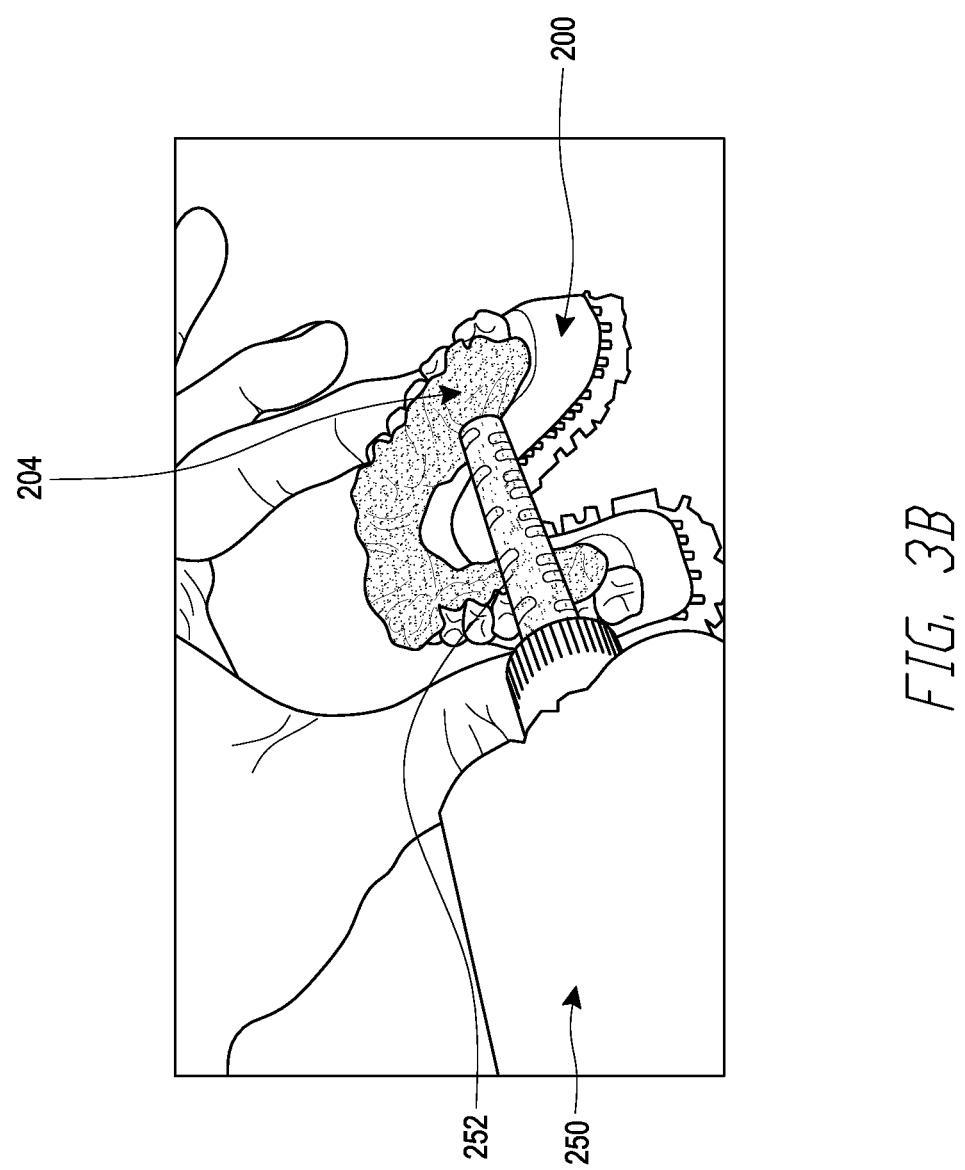
Figure 4A:
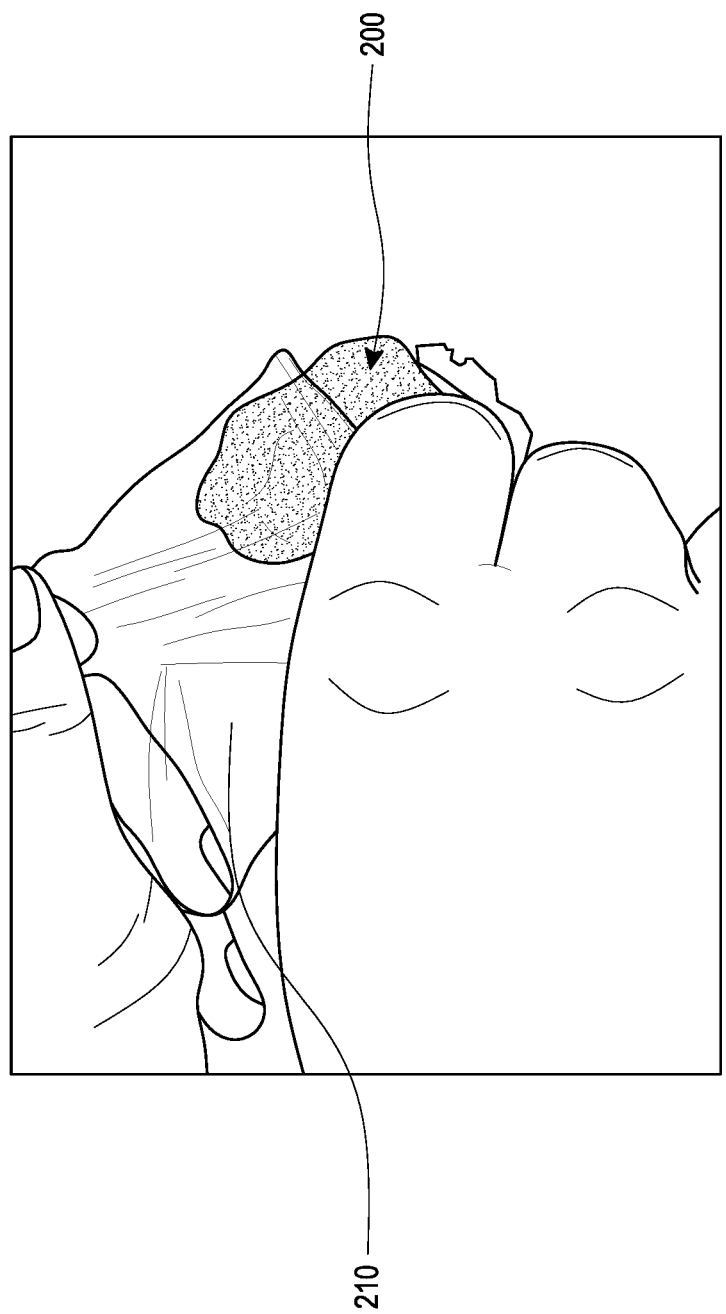
FIGS. 4A-4C illustrate using poly wrap in the progressive fabrication of an indirect bonding tray, creating a membrane such that the polyvinyl siloxane can be further molded into a desired arch shape, according to some embodiments of the invention.
Figure 4B:
Figure 4C:
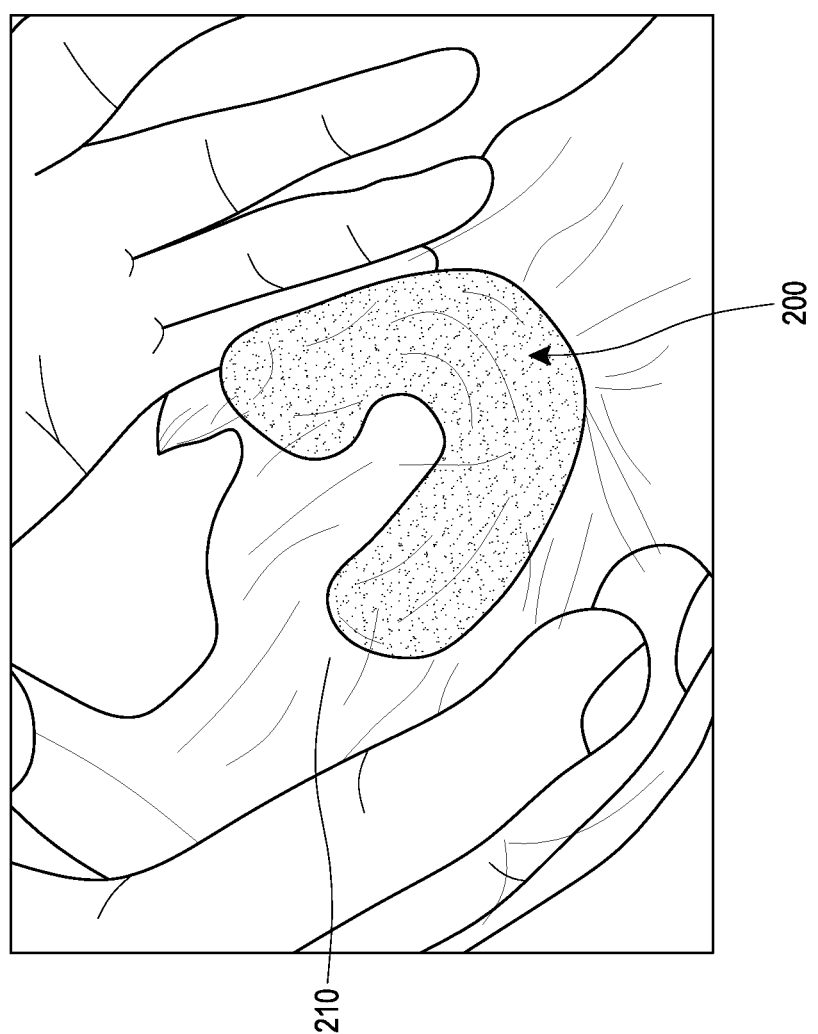
Figure 5:
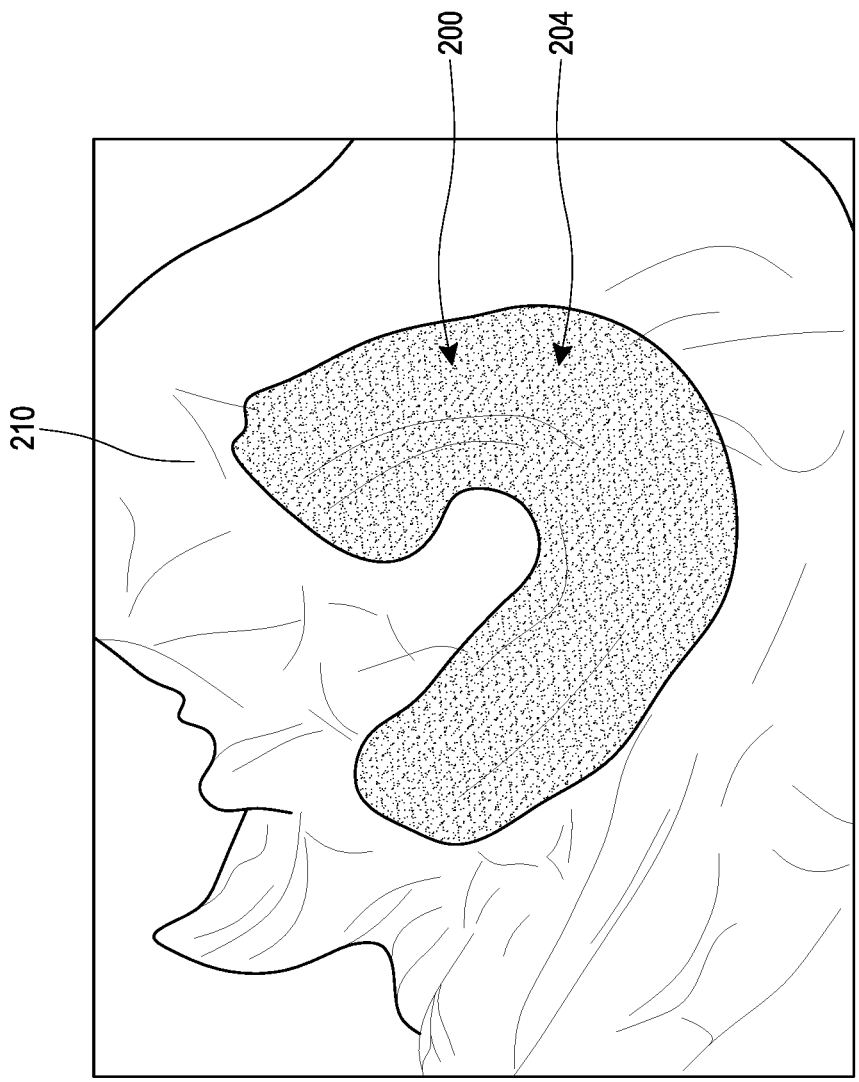
FIG. 5 illustrates the curing of an indirect bonding tray, by leaving the tray at ambient room temperature for a desired curing time, such as between about 1-10 minutes, or about 3 minutes in some embodiments.
Figure 6A:
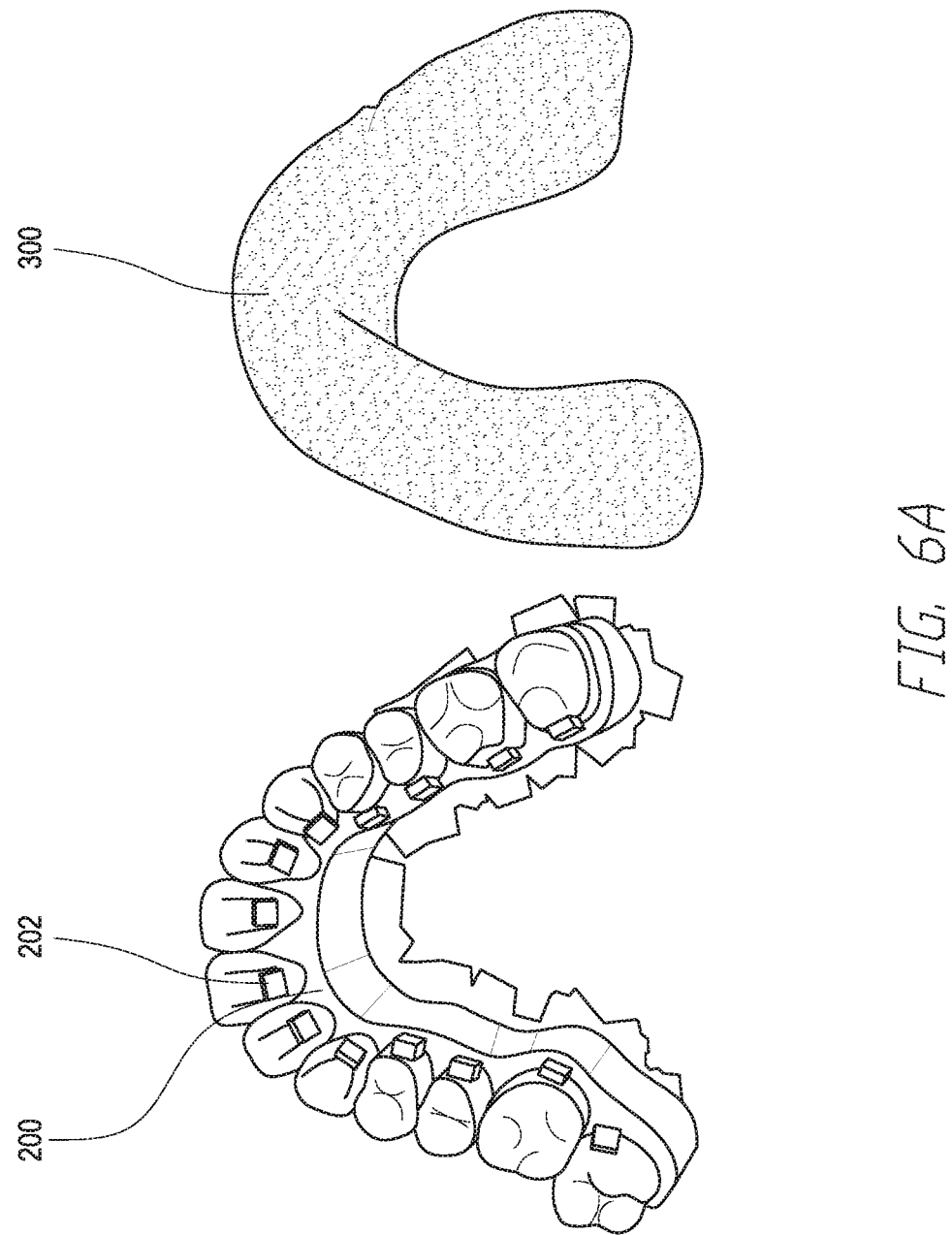
FIGS. 6A-6C illustrate the separation of the indirect bonding tray from the bonding model after curing has occurred, according to some embodiments of the invention.
Figure 6C:
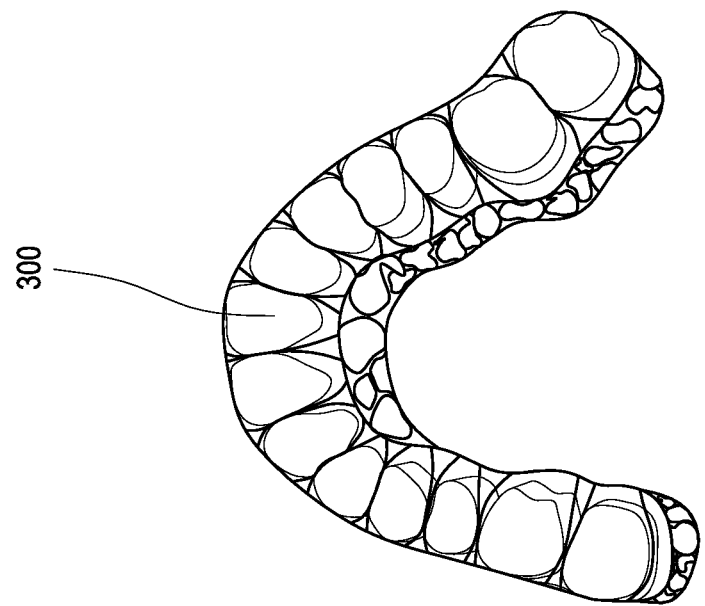
Figure 6B:
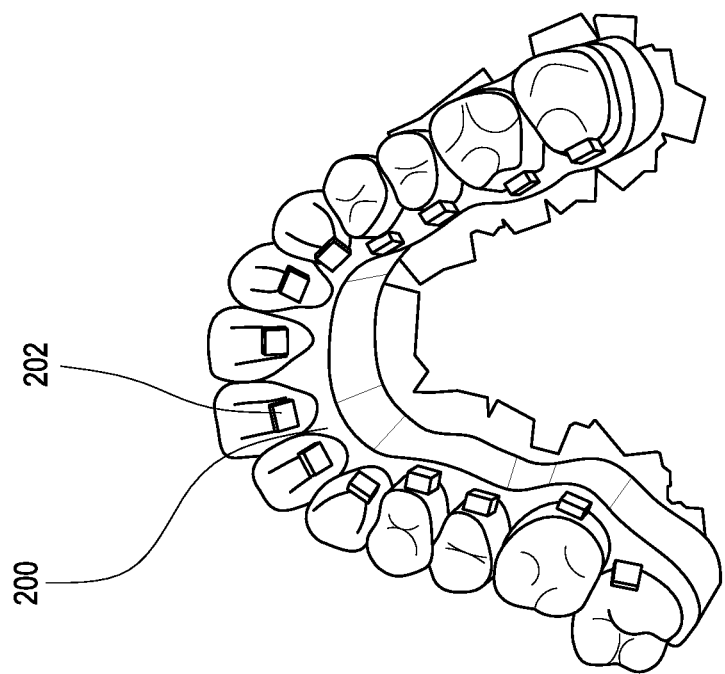
Figure 7:
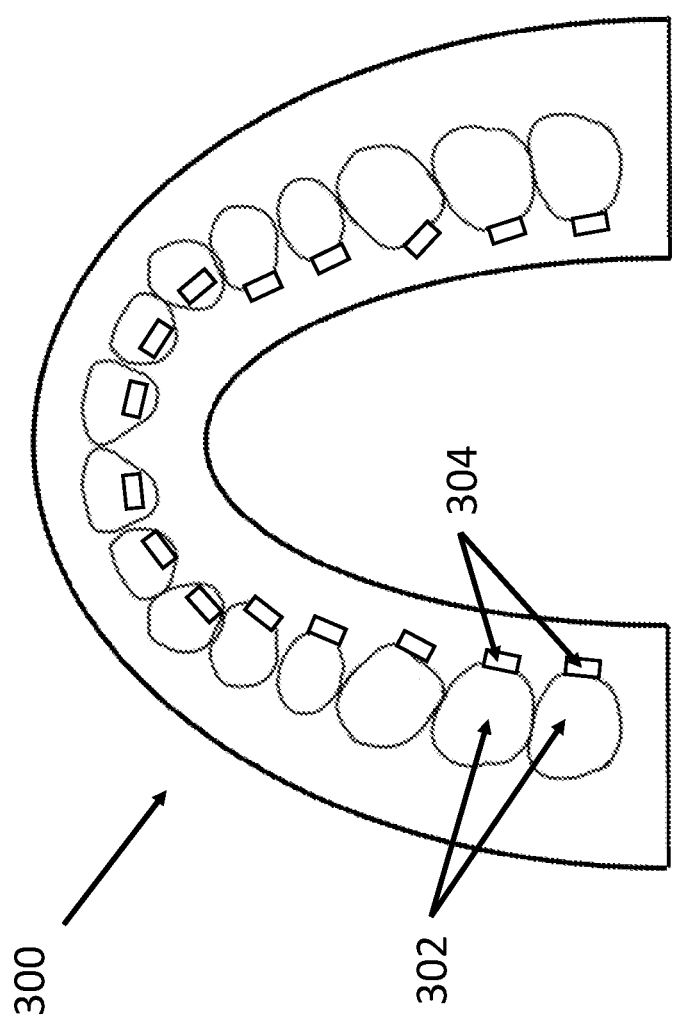
FIG. 7 schematically depicts an occlusal view of the indirect bonding tray, according to some embodiments of the invention.

FIGS. 1A-1D schematically illustrate examples various non-limiting modifications that may be made to the external dimensions or geometry of a functional bracket. FIGS. 1A and 1B depict examples of functional orthodontic brackets 100. FIG. 1A illustrates a side view of the bracket 100 (e.g., a distal or medial view) and FIG. 1B illustrates an orthogonal side view (e.g., a gingival or occlusal view) of the bracket 100. FIGS. 1C and 1D illustrate the same views of the bracket 100 as FIGS. 1A and 1B, respectively, including schematic depictions of various possible modifications 102 (depicted in dashed lines) to the outline of the external surface or geometry of the bracket 100. One or more modifications 102 may be incorporated into a digital representation of a placeholder bracket based on the functional bracket 100. The modifications 102 may simplify the level of complexity of the external geometry of the bracket 100. For example, the archwire slot may be eliminated or reduced in dimension. The modifications 102 may be designed to optimize and/or simplify the fabrication of a negative impression (e.g., an IDB tray) of the placeholder bracket from a physical model of the teeth with placeholder brackets. For instance, the modifications may eliminate (e.g., fill in) void volumes of the bracket 100 which are unnecessary for, do not significantly facilitate, and/or convolute the proper placement and/or retention of a functional bracket 100 in an IDB tray. For example, geometries which would result in very thin and/or flimsy projections protruding from an internal surface of a well in the IDB tray may provide little or no structural support and/or little or no positioning guidance for the functional bracket 100, particularly depending on the physical properties of the material from which the IDB tray is fabricated. In some implementations, the geometry may be modified to facilitate transfer of the functional brackets 100 to the patient's teeth. For example, the geometry may be modified such that the IDB tray may more easily be retracted or withdrawn from the patient's teeth without excessively clinging to the bonded functional brackets 100. The IDB tray may have a degree of deformability that allows the tray to be removed from brackets 100 after they have bonded to the patient's teeth. The geometry of the placeholder brackets may be modified to optimize retention of the functional brackets 100 in the IDB tray (e.g., during movement such as transfer to the patient's mouth) as well as release of the IDB tray from the functional brackets 100 after bonding. The modifications 102 may include reangling of portions of the outer geometry, eliminating or reducing the dimensions of undercuts, etc. In some embodiments, the external geometry of the placeholder brackets may be additionally or alternatively expanded beyond the true dimensions of the functional bracket 100;

The lab may replace the digital brackets with digital placeholder brackets. The digital placeholder brackets can be placed in the same exact position, or substantially similar location, as the digital brackets. The true outline of the bracket interface with the individual tooth may be preserved to ensure proper alignment of the functional bracket 100 with the patient's tooth during transfer;

The digital teeth and placeholder brackets of the ideal occlusion model may be moved back onto the malocclusion digital model. The digital placeholder bracket position relative to the tooth may be maintained as the teeth are repositioned from a state of ideal occlusion back to original state of malocclusion;

The digital placeholder brackets and the malocclusion digital model can be combined into a single file for each arch;

Supports may be added to the model to aid in rapid prototyping. The supports can facilitate fabrication of the physical model and/or handling of the physical model. For instance the supports may provide structural support to the physical model during fabrication;

Digital perforations may be added between one or more teeth. These perforations would allow the clinician to snap off individual teeth or groups of teeth to make sectional indirect bonding (IDB) trays;

The lab may rapid prototype this final digital model that includes the malocclusion digital model with placeholder brackets and supports into a physical model. Alternatively, the lab may send the final digital model to the doctor (e.g., electronically send via the internet) to allow direct fabrication by the doctor. FIG. 2 depicts an image of a physical model 200 of a patient's teeth including placeholder brackets 202. The placeholder brackets 202 may be formed as an integral part of the model 200 during fabrication of the model 200. In some embodiments, the placeholder brackets may be simplified down to a generally cubic representation of the functional orthodontic bracket. Fabrication of the physical model may be performed by a rapid prototyping means, such as 3D printing, or any other suitable means known in the art. In some embodiments, the physical model may comprise the entire set, or only a subset of the patient's teeth. The subset of teeth may correspond to a segment of the dental arch. The physical model may correspond in size (e.g., the length the tray extends along the dental arch) to the segment of the dental arch or may correspond to the entire arch but may not include teeth not selected as part of the subset;

Any added supports may be removed from the rapid prototyped model as necessary. The supports may be fabricated (e.g., with reduce cross sections) such that they allow easy and precise breakage of the support from the remainder of the model with application of a sufficient amount of manual force. The supports can also be kept to be used as handles to hold the physical model 200 for later processes;

If the lab produces the physical model, the lab may either proceed with making the IDB tray, or the lab may mail the rapid prototyped model to the doctor to allow the doctor to make the IDB tray;

The IDB tray can be formed by applying polyvinyl siloxane (PVS) or other impression-forming moldable material, over the rapid prototyped model covering the placeholder brackets and all or selected surfaces of the teeth. FIGS. 3A-3C illustrate images of the progressive application of a moldable material 204 (e.g., PVS) to the physical model 200. As shown in FIGS. 3A-3C, the moldable material may be injected onto the physical model 200 using a delivery device 250 having an application tip 252. Any other suitable application means may be used as well. The placeholder brackets 202 from the rapid prototyped model can create the wells that the orthodontic brackets 100 can be placed into on the IDB tray. In embodiments where the physical model comprises only a segment of the patients' dental arch, the moldable material 204 may be applied only over the segment (which may comprise the entire physical model) such that an IDB tray corresponding in size to only the segment is formed. Alternatively, the moldable material 204 may be applied to only a select subset of teeth to form one or more IDB trays corresponding in size to one or more segments of the dental arch. Partial IDB trays may be useful for performing bracket replacements and/or for subsequent placement of brackets that were initially infeasible to place (e.g., due to physical interference such as overcrowding) as described elsewhere herein;

While the moldable material 204 is still moldable, the moldable material 204 can be molded into the desired arch form. In some embodiments, a flexible membrane 210 may be used to facilitate the molding of the moldable material 204 into the IDB tray. In some embodiments, the membrane may comprise polyethylene (e.g., poly wrap). The membrane 210 can facilitate retaining the somewhat fluidic moldable material 204 into a desired geometry around the physical model 200 while allowing the clinician to bend and shape the moldable material 204 into the desired form. FIGS. 4A-4C illustrate images of the use of a membrane to progressively shape the applied moldable material 204 around the physical model 200 into a desired arch form. The membrane 210 may be particularly useful for shaping the outer surface of the IDB tray;

The moldable material 204 may be cured after shaping. The moldable material 204 may automatically cure over time upon application. FIG. 5 illustrates curing of the moldable material 204 to form a solid IDB tray around the physical model 200. For example, PVS may cure by leaving the PVS material at ambient room temperature for a period of several minutes (e.g., 1-10 minutes, or more or less). In some embodiments, the PVS may be adequately cured after about 3, 4, 5, 6, 7, 8, 9, or 10 minutes, or ranges including any two of the aforementioned values. In some embodiments, application of heat and/or light may be used to cure or to facilitate curing the impression material;

The moldable material 204 can be removed from the rapid prototyped model after curing is complete yielding an IDB tray 300 which can be used for indirect bonding of orthodontic brackets. FIG. 6A illustrates an image of the separated IDB tray 300 and the physical model 200, after curing of the moldable material has occurred. FIGS. 6B and 6C depict the separated physical model 200 and IDB tray 300, respectively. FIG. 7 schematically depicts an occlusal view of the IDB tray 300. The IDB tray 300 may be formed as a negative impression of the physical model 200 which includes placeholder brackets 202. The IDB tray 300 may include wells 302 for fitting to a patient's teeth as well as wells 304 for receiving one or more functional orthodontic brackets 100 to be transferred to the patient's teeth. The wells 302 of the teeth may merge with each other. Each dental arch may essentially form one large well or a plurality of wells larger than individual teeth. The wells 304 may also merge into the wells 302 of the teeth. The wells 304 may be formed to match the external outline or geometry of the functional brackets 100 based on the digitally modified placeholder brackets 202. The bracket wells 304 may cause the teeth wells 302 to extend deeper into the impression material of the IDB tray 300, such as in an occlusal and/or lingual direction. Although the brackets 100 depicted herein are depicted as lingual orthodontic brackets, the methods and systems described herein may be equally applied to other arrangements of orthodontic devices, including buccal orthodontic brackets;

The lab or doctor may place the functional brackets 100 securely inside the bracket wells 304 in the IDB tray 300 with the bonding side of the brackets facing outward away from the impression material of the IDB tray and toward the open well 302 conformed to receive the patient's teeth;

Adhesives may be added on the bonding side of the IDB tray 300. Adhesives may be added to the brackets 100 after all the brackets are properly placed in the IDB tray 300 in some cases. The adhesives may be cured or partially cured prior to transferring the tray and/or during application of the IDB tray 300 to the patient's teeth. After allowing sufficient time for the functional brackets 100 to securely bond to the patient's teeth, the IDB tray 300 may be removed from the patient's mouth leaving the functional brackets 100 in place on the patient's teeth; and If the lab made the IDB tray 300, the lab can mail or otherwise send the IDB tray 300 pre-loaded with brackets 100 and optionally the rapid prototyped model 200 to the doctor;

Alternatively, the IDB tray 300 can be sent to the orthodontic office allowing the office to load the brackets 100 into the IDB tray 200.

A wide range of impression materials is available for taking dental impressions, such as to form the IDB tray 200. The major chemical classes of elastomeric impression materials include irreversible hydrocolloids, reversible hydrocolloids, polysulfide, polyether, condensation reaction silicones and addition reaction silicones. Alginates are examples of irreversible hydrocolloids formed by combining the sodium salt of alginic acid, calcium sulfate and water. Commercially available alginate impression materials include Jeltrate® (Dentsply/Caulk), Coe Alginate® (Coe) and Kromopan® (Lascod S.p.A.). Polyethers come as a two part system consisting of base and catalyst pastes. The base contains a polyether with imine end groups and the catalyst contains an aromatic sulfonic acid. These components may be either mixed by hand or dispensed from a dual chambered cartridge that automatically mixes the correct proportions of base and catalyst material. Commercially available polyether materials include Impregum F® (ESPE), Permadyne® (ESPE) and Polyjel® (Dentsply/Caulk). Like polyethers, addition reaction silicones are a two part system consisting of base and catalyst pastes. These materials are also called polyvinylsiloxanes or vinyl siloxanes since vinyl groups are present as terminal end groups in one paste. The other paste contains terminal hydrogens. When mixed together they form a highly cross-linked elastomeric material which recovers well from deformation. Commercially available PVS impression materials include Splash® (Discus Dental), Aquasil® (Dentsply/Caulk) and Dimension® (ESPE). Depending on the radiopacity of the tray and impression materials in some applications it may be useful to directly compound a radiopaque material into the impression material to achieve a desired attenuation. The radiopaque material may be formulated into the impression materials described previously.

In some embodiments, the IDB tray 300 may comprise indicia, including instructional information printed or otherwise marked on the tray 300. The information may comprise, for example, identification markers that include, for instance, information relevant to placing the proper tray in the proper location on the correct patient's teeth (e.g., tooth number position, upper or lower arch indicator, patient number, etc.). In some cases, the information may be transferred from the physical model 200 to the interior surface of the indirect bonding tray 200. For example, the physical model 300 may be modified with a relief, embossment, stamp, indentation, etc. of text or other markings indicative of the information. The information may be positioned, for example, in a tooth well such that it can be seen even after placement of the functional orthodontic brackets 100. The information may be sized (e.g., in area and/or depth) such that it does not significantly alter negative impression and, therefore, does not interfere with the proper fitting of the IDB tray 300 to the patient's teeth. In some cases, the corresponding wells of the indirect bonding tray may be colored (e.g., with an agent, ink, or paint) to make the information more readily visible. For example, the colored agent, ink, or paint may fill an indentation in the IDB tray 300 before drying such that it makes the information stand out. Residual agent, ink, or dye may be wiped clean form the surface of the IDB tray 300. Additionally or alternatively, information may be transferred to an external surface of the indirect bonding tray by molding the IDB tray 300 with an additional external tray which shapes the outer surface of the IDB tray 300. In some embodiments, the information may be directly transferred onto the IDB tray 300. For example, the information may be written on the tray or a marker comprising the information may be attached to the tray IDB tray 300. In some embodiments, the information may be in non-textual form. For example, the information may be a color or fiduciary marker. In some embodiments, the information can be contained within a barcode, passive or active RFID tag, or other elements that can be positioned in various locations similar to the indicia noted above.

Various other modifications, adaptations, and alternative designs are of course possible in light of the above teachings. For example, features including brackets disclosed in U.S. Pub. No. 2014/0120491 A1 to Khoshnevis et al., hereby incorporated by reference in its entirety, can be utilized or modified or use with embodiments as disclosed herein. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "transferring an orthodontic bracket" includes "instructing the transferring of an orthodontic bracket." The ranges disclosed herein also encompass any and all overlap, subranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

What is claimed is:

1. A method for fabricating an indirect bonding tray for placement of orthodontic brackets, the method comprising:
   providing a digital model of a patient's teeth in positions of malocclusion;
   digitally moving the patient's teeth from the positions of malocclusion to positions of ideal occlusion in the digital model;
   digitally positioning digital brackets on respective surfaces of the patient's teeth while in the positions of ideal occlusion in the digital model;
   digitally restoring the patient's teeth from the positions of ideal occlusion to the positions of malocclusion while maintaining the positioning of the digital brackets on the respective surfaces of the patient's teeth in the digital model;
   providing a physical model of the patient's teeth based on the digitally restored model of the patient's teeth, the physical model comprising at least one non-functional placeholder orthodontic bracket each attached to a respective tooth of the physical model corresponding to the positioning of a corresponding one of the digital brackets on a corresponding one of the surfaces of the patient's teeth in the digitally restored model;
   shaping a moldable material over the physical model of the patient's teeth and the at least one non-functional placeholder orthodontic bracket of the physical model, thereby creating an indirect bonding tray, the indirect bonding tray comprising at least one well each corresponding to a respective one of the at least one non-functional placeholder orthodontic bracket as positioned on a respective one of the teeth of the physical model; and
   securing a functional orthodontic bracket within a corresponding one of the at least one well of the indirect bonding tray, the functional orthodontic bracket comprising substantially the same external geometry as a respective one of the non-functional placeholder orthodontic bracket.

2. The method of claim 1, further comprising curing the moldable material.

3. The method of claim 1, wherein the moldable material comprises polyvinyl siloxane.

4. The method of claim 1, wherein the at least one non-functional placeholder orthodontic bracket comprises a plurality of non-functional placeholder orthodontic brackets, and wherein the at least one well of the indirect bonding tray comprises a plurality of wells each corresponding to a respective one of the plurality of non-functional placeholder orthodontic brackets.

5. The method of claim 1, wherein the at least one non-functional placeholder orthodontic bracket comprises a same material as the physical model.

6. The method of claim 1, further comprising modifying the digital brackets while retaining an external geometry of the digital brackets.

7. The method of claim 6, wherein modifying the digital brackets comprises reducing or removing internal undercuts thereof.

8. The method of claim 6, wherein modifying the digital brackets comprises removing internal details of the digital brackets.

9. The method of claim 1, further comprising applying a flexible membrane around the moldable material and shaping the moldable material into a shape of a dental arch of the patient.

10. The method of claim 1, wherein the physical model includes instructive information indicative of proper positioning of the indirect bonding tray on the patient's teeth and/or patient identification, the method further comprising transferring the instructive information from the physical model to the indirect bonding tray.

11. The method of claim 1, further comprising transferring instructive information indicative of proper positioning of the indirect bonding tray on the patient's teeth and/or patient identification from an external tray positioned around the moldable material to the indirect bonding tray while the moldable material is moldable.

12. The method of claim 1, wherein providing the physical model comprises 3D printing the physical model according to the restored digital model.

13. The method of claim 1, wherein the physical model comprises support structures, the method further comprising removing the support structures from the physical model prior to shaping the moldable material thereover.

14. The method of claim 1, wherein the physical model comprises at least one perforation between two teeth of the physical model, the method further comprising sectioning the physical model along the at least one perforation.

15. The method of claim 1, wherein providing the physical model comprises fabricating the physical model such that only a subset of the patient's teeth corresponding to a segment of a dental arch of the patient are represented in the physical model, and wherein the indirect bonding tray corresponds in size to the segment of the dental arch of the patient.

16. The method of claim 1, wherein:
   the at least one non-functional placeholder orthodontic bracket comprises a plurality of non-functional placeholder orthodontic brackets each attached to a respective one of the teeth of the physical model corresponding to the positioning of a corresponding one of the digital brackets on a corresponding one of the surfaces of the patient's teeth in the digital model restored to the positions of malocclusion;
   the at least one well comprises a plurality of wells each corresponding to a respective one of the at least one non-functional placeholder orthodontic bracket as positioned on a respective one of the teeth of the physical model; and
   the functional orthodontic bracket is one of a plurality of functional orthodontic brackets each secured within a respective one of the wells of the indirect bonding tray.

* * * * *